(12) United States Patent
Hall

(10) Patent No.: US 7,514,827 B2
(45) Date of Patent: Apr. 7, 2009

(54) SELF-COOLED ROTOR FOR AN ELECTRICAL MACHINE

(75) Inventor: Justin Arthur Hall, Weybridge (GB)

(73) Assignee: Turbo Power Systems Limited (GB)

( * ) Notice: Subject to any disclaimer, the term of this patent is extended or adjusted under 35 U.S.C. 154(b) by 29 days.

(21) Appl. No.: 11/540,456

(22) Filed: Sep. 29, 2006

(65) Prior Publication Data

US 2007/0075596 A1    Apr. 5, 2007

(30) Foreign Application Priority Data

Oct. 1, 2005    (GB)    .................. 0520013.4

(51) Int. Cl.
 *H02K 1/32* (2006.01)
(52) U.S. Cl. .......................................... 310/61; 310/64
(58) Field of Classification Search .................. 310/61, 310/64, 261
See application file for complete search history.

(56) References Cited

U.S. PATENT DOCUMENTS

| 3,261,295 | A | * | 7/1966 | White | 310/61 |
| 4,902,922 | A | * | 2/1990 | Annovazzi | 310/61 |
| 5,019,733 | A | | 5/1991 | Kano et al. | |
| 5,149,141 | A | * | 9/1992 | Newhouse | 285/13 |
| 6,087,744 | A | * | 7/2000 | Glauning | 310/58 |
| 2003/0030333 | A1 | | 2/2003 | Johnsen | |

FOREIGN PATENT DOCUMENTS

GB    1381109 A    12/1971

* cited by examiner

*Primary Examiner*—Nguyen N Hanh
(74) *Attorney, Agent, or Firm*—Kaplan Gilman & Pergament LLP

(57) ABSTRACT

A self-cooled rotor for an electrical machine being internally provided with a cooling channel to carrying cooling fluid. The machine includes a further channel for carrying cooling fluid in proximity to a magnetic field generating means for cooling it, the two passages being connected to each other within the machine.

10 Claims, 3 Drawing Sheets

A–A

SELF-COOLED ROTOR FOR AN ELECTRICAL MACHINE

FIELD OF THE INVENTION

The present invention generally relates to a self-cooled rotor, in particular for a high speed permanent magnet electric machine, such as a generator.

BACKGROUND OF THE INVENTION

Rotors in high speed machines are generally operated in an environment where both mechanical frictional losses (windage) and electrical current losses (eddy currents) contribute to the heating of the rotor during operation. Therefore cooling of the rotor in such machines is an important factor when considering their design.

In a radial flux machine, the rotor is often configured as a drum, rotating inside an annular stator assembly, with shaft bearings at either end of the drum. Rare earth permanent magnets are typically mounted to the shaft of the rotor and project an electromagnetic field radially outwards from the drum in a pattern determined by the number and shape of the magnetic poles. As these machines operate at high surface speeds (over 150 m/s), it is generally required to place a retaining sleeve around the magnets to keep them in place on the shaft. The selection of material for this sleeve is driven by a requirement for low density, high stiffness and high strength but also by a requirement for high longitudinal electrical resistivity, to minimise the electrical losses that manifest themselves in the sleeve due to its close proximity to the stator windings.

These electrical losses are primarily due to harmonic currents in the stator and are controlled by careful design of the electromagnetic circuit. However, any material that sits in the air gap between the magnets on the rotor and the stator will be subject to these harmonics, generating losses due to eddy currents in these materials. Accordingly, a carbon fibre composite is often selected as the most suitable material for the retaining sleeve. However, even with the use of a high resistivity carbon fibre sleeve, there is still a need to consider the cooling of the magnet material and any pole spacers that sit between the magnets, as these will also be subject to heat build up due to electrical losses.

It is known to provide cooling air to the rotor by forcing air to flow through the small radial gap between the outer diameter of the rotor sleeve and the bore of the stator. The size of this gap is important to both the electromagnetic performance of the machine as well as in determining the magnitude of the friction losses between rotor and stator. These considerations mean that the air gap is preferably as small as possible without unduly increasing friction to an unacceptable level.

Problems can therefore occur when the rotor is relatively long, as this leads to a pressure gradient building up over the length of the rotor. A higher pressure ratio is therefore required to move sufficient air through the gap. In addition, this will mean that the cooling air is continuously heated from one end to the other, and hence the components within the rotor will see a temperature gradient from one end to the other. Higher temperatures will adversely affect the performance of both the permanent magnets and the carbon fibre sleeve, and therefore the temperature at the hot end of the shaft will be the determining factor in the required flow rate of cooling air. Increasing the mass flow rate of cooling air through the gap to limit the temperature rise will normally cause the friction losses to increase, compounding the problem.

An additional problem with the known methods of cooling rotors in high speed machines is that the carbon fibre sleeve acts as a thermal insulator for the magnets and rotor structure underneath. Therefore, any heat produced from electrical losses in the rotor under the sleeve will be more difficult to remove using the air forced over the outer diameter of the sleeve. In addition, with known methods, the pressure ratio required to move sufficient cooling air through the radial air gap needs to be generated from an external source such as a cooling fan or by virtue of other means, which increases the cost and complexity of the system.

SUMMARY OF THE INVENTION

Therefore, according to the present invention, there is provided a rotor for an electric machine, comprising a main body, one or more magnetic field generating means arranged around the outer periphery of the main body, a first channel extending axially into the main body from at least one end to a central region, and one or more second channels extending radially outwardly between the first channel and a radially outer surface of the rotor for communicating cooling fluid therebetween.

The main body may be generally cylindrical and the magnetic field generating means can be oriented such that, in use, radial flux is generated. The first channel can be provided in the central rotor shaft.

The rotor may further comprise one or more third channels, each extending axially into the rotor from one or the other end of the rotor and arranged in proximity to the magnetic field generating means, and one or more fourth channels in the central region, each extending radially outwardly between the first channel and a respective third channel for communicating cooling fluid therebetween.

The second channels can exhaust directly to the outer circumference of the rotor. This provides a source of cooling fluid to the gap between the rotor and stator in the middle of the machine. The cooling fluid can then pass in both directions in the gap towards the end of the machine. This provides a dual cooling action along with the internal cooling of the magnets by the third and fourth channels to maximise the overall cooling of the machine. As the rotor may rotate at very high surface speeds, the present invention allows a cooling fluid, such as air, to be drawn in at one end of the first channel and be conducted into the second channel and into the third channel via the fourth channel. This provides a cooling path for cooling fluid to enter the rotor internally, and then pass through the third channels to cool the magnetic field generating means. The second and fourth channels preferably provide a pumping action to move the cooling fluid through the channels. The generally radial direction of the second and fourth channels and the rotation of the rotor cause the cooling fluid to be displaced outwardly. This pumping action may be improved by situating the channels in a plane of the rotor that is perpendicular to the longitudinal axis of the rotor and having the channels swept or angled to the radii of the rotor. This creates a central plenum, so that, upon rotation of the rotor, cooling fluid is forced outwards along the second and fourth channels.

By controlling the relative amount of cooling fluid flowing through the second and fourth channels, the cooling fluid can be divided between the two in a ratio to provide sufficient cooling to the rotor/stator gap without causing excessive windage losses by passing too much cooling fluid through the gap. Hence, the cooling of the machine may be optimised according to the relative amounts of heat generated by the electrical and mechanical losses in the machine.

The fourth channels preferably lie in the same plane as the second channels and are angled in a similar manner. Preferably, the second and fourth channels are interspersed with each other to provide an even distribution of cooling fluid. If the channels are angled to the radii of the rotor, pumping of cooling fluid through the second and fourth channels by virtue of the rotational motion of the rotor can be improved. By optimising the angle for the desired speed of rotation, the pumping action can be optimised, preferably so that no additional external pump or fan is required.

The first channel preferably runs along the central longitudinal axis of the rotor. The second and fourth channels can join the first channel either at a point on the central longitudinal axis, so that the second and fourth channels are perpendicular to the first channel, or at a point offset from the central axis. If the second and fourth channels join the first channel at a point offset from the central axis, so that there is an angle between them and a line perpendicular to the first channel, a plenum chamber is formed at the point where they coalesce. This provides a region for cooling fluids to pass from the first channel into the second and fourth channels. Sharp edges are formed where the inner ends of the second and fourth channels meet the plenum chamber so these are chamfered to reduce losses where the cooling fluid changes direction flowing from the plenum chamber into the channels.

The second and fourth channels can be connected to the first channel at a mid point of the longitudinal axis of the rotor so that cooling fluid is introduced to the magnetic field generating means or outer surface of the rotor at a point halfway along the rotor and then exhausted at both ends. This helps to minimise the pressure and temperature gradient along the rotor since fluid is only passed down half the length of the rotor. This is in comparison to feeding the fluid in at one end and out at the other end where the fluid is heated over the entire length of the rotor. As a result, the pressure and temperature difference between the cooling fluid at the inlet compared to the outlet is much greater and hence the cooling efficiency is poorer. This also means that the power out of the device is restricted by the temperature at the outlet end.

A core can be provided between the first channel and the magnetic field generating means to provide a support structure for the magnetic field generating means and the channels, so that the third channels extend through the core into the magnetic field generating means. A retaining sleeve can also be provided around the rotor to hold the magnetic field generating means in place when the rotor is turning at high speeds.

The magnetic field generating means can comprise either permanent magnets or electromagnets, and may also comprise pole separators provided between each of the poles of the magnet. The third channels may pass through the pole separators to one or both ends of the rotor. Alternatively, the third channels may pass through the magnetic field generating means themselves.

The pole separators may form a part of a frame structure for the magnetic field generating means. The magnets are then surrounded by the frame structure to retain them in position. The frame structure may be formed as two separate structures for each half of the rotor. The rotor is preferably further provided with a sleeve around the outer periphery of the rotor to retain the magnetic field generating means from moving radially outwards.

Thus, the present invention provides the advantage of an internally cooled rotor for an electric machine with little or no need for external pumping of rotor cooling air. The present invention also provides the advantage that high pressure and temperature gradients in the rotor are avoided, leading to improved performance. In addition, the rotor of the present invention provides the advantage that cooling due to mechanical and electrical losses takes place using separate parallel circuits, thereby allowing flow rates and temperature rises for each to be optimised separately.

BRIEF DESCRIPTION OF THE DRAWINGS

An example of an embodiment of the invention will now be described in detail with reference to the accompanying drawings, in which.

DESCRIPTION OF THE INVENTION

Figure 1:
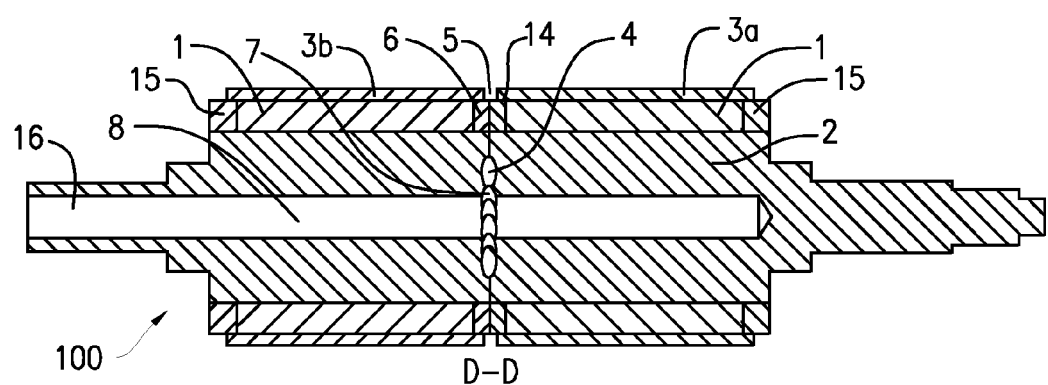
FIG. 1 is an axial cross-section of a rotor along D-D for an electric machine according to an embodiment of the present invention.
Figure 4:
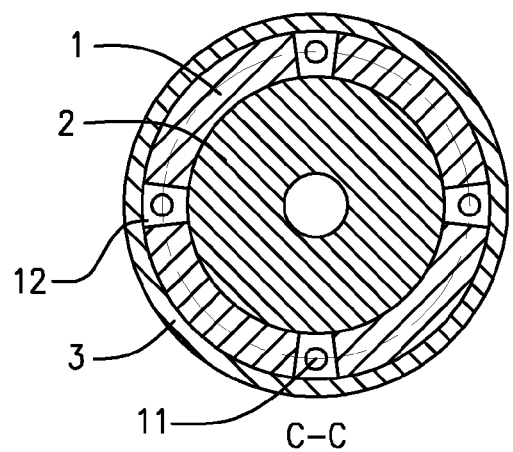
FIG. 4 is a radial cross-section of a rotor along C-C for an electric machine according to an embodiment of the present invention.

FIG. 1 shows an axial cross-section of a rotor 100. The rotor 100 has a generally cylindrical core 2 comprising an axial channel 8 defining a generally cylindrical blind aperture. Permanent magnets 1, which are typically constructed from a rare earth metal, are mounted to the core 2 and project a magnetic field radially outwards from the core 2. The magnets 1 are arranged in two sections with an axial gap between the sections. Axial spacers 6 are provided in the axial gap. The magnets are separated by pole spacers 12, shown in cross-section in FIG. 4, which are typically made from a non-magnetic material that has high thermal conductivity to extract heat from the magnets. The axial spacers 6 are constructed of the same material as the pole spacers 12. The axial spacers 6 and the pole spacers 12 together with additional annular sections 15 at the outer ends of the rotor form a support frame around each pole of the magnets 1. The support frame is configured as a single piece structure around all of the poles. The support frame is manufactured in two halves, to assist with manufacture and assembly. The point at which the two halves of the rotor frame are mated together so as to be assembled to the shaft is shown by the line 14. Forming the support frame in two halves allows for easier machining of channels which pass into the axial channel 8, described in detail below.

A retaining sleeve 3a, 3b is placed around each of the magnet sections 1 to retain them in place on the core 2 of the rotor when it is operating at high speeds. The sleeve 3a, 3b is manufactured as two separate pieces. The retaining sleeve 3a, 3b is made from a material having a low density, high stiffness and strength and a high electrical resistivity, such as carbon fibre. The support frame also serves to support the retaining sleeves 3a, 3b. An outer plenum 5 is provided in the retaining sleeves 3a, 3b, which is adjacent to the axial gap 6 between the magnets 1 The outer plenum 5 and the axial gap 6 are formed by the sleeve being manufactured as two separate pieces which do not contact each other.

Figure 2:
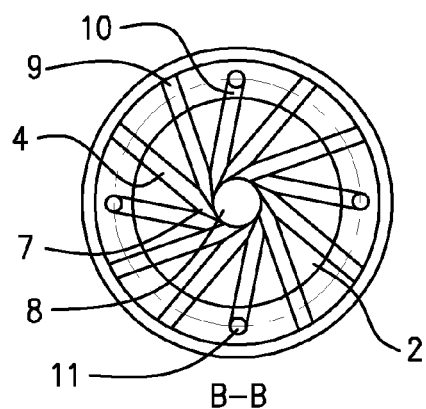
FIG. 2 is a radial cross-section of a rotor along B-B for an electric machine according to an embodiment of the present invention.

Channels 4 extend through the core 2 from the axial channel 8 to the outer periphery of the core 2. The channels extend in a direction offset from the radial direction so that the channels are swept in a plane perpendicular to the central longitudinal axis of the core 2. The axis of each channel is offset so that it does not pass through the central longitudinal axis of the core 2. Where the radial channels 4 join the axial channel 8, they form a region of enlarged diameter compared to the channel 8 which acts as a plenum chamber 7. This is shown in more detail in FIG. 2, which is a radial cross-section of the rotor 100.

Further channels 9 and 10 provided in the axial spacers 6 extend the passages defined by the channels 4. The channels 9 extend through the axial spacers 6 to the outer surface and open into the outer plenum 5 between the retaining sleeves 3a, 3b. The channels 10 extend only partially through the radius of the axial spacers 6. The channels 10 then connect with longitudinal channels 11 formed in the pole spacers 12. The longitudinal channels 11 continue axially within the pole spacers 12 towards the ends of the rotor. They continue through the annular sections 15 at the end of the rotor, to exhausts 13. The exhausts 13 are preferably formed as radial channels in the ends faces of the annular sections 15.

Figure 3:
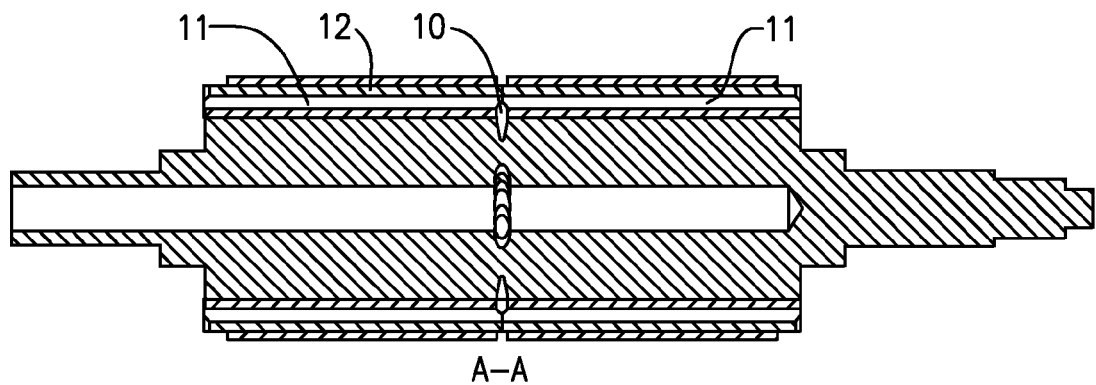
FIG. 3 is an axial cross-section of a rotor along A-A for an electric machine according to an embodiment of the present invention.
Figure 5:
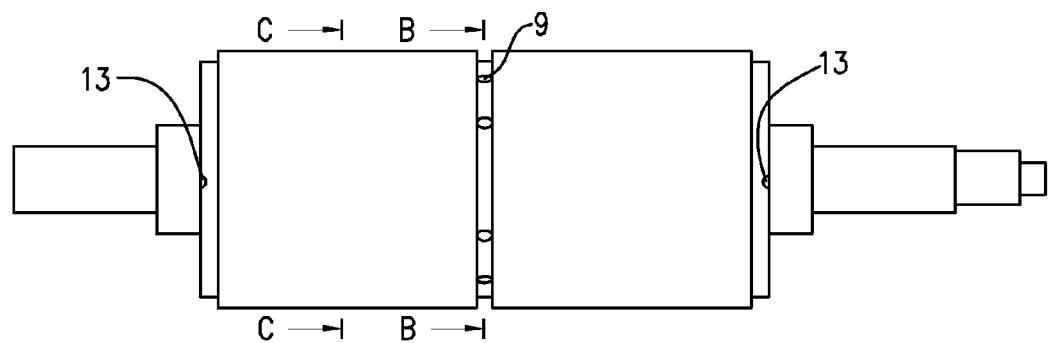
FIG. 5 is a top view of a rotor for an electric machine according to an embodiment of the present invention.
Figure 6:
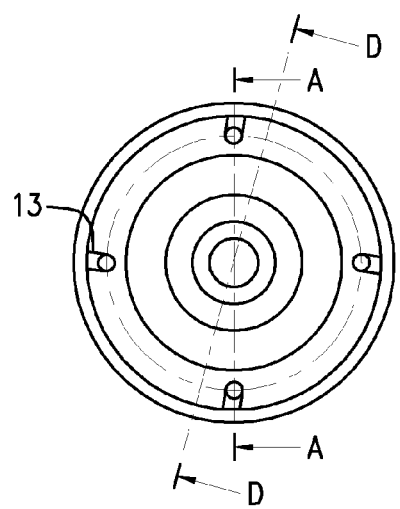
FIG. 6 is an end view of a rotor for an electric machine according to an embodiment of the present invention.

FIG. 3 is an axial cross-sectional view of the rotor 100, showing the pole spacers 12, which are placed between opposite poles of the magnets 1. FIG. 3 also shows the longitudinal channels 11, extending along the full length of each pole spacer 12. This is shown in radial cross-section in FIG. 4. The longitudinal channels 11 end at the exhausts 13, which are shown in FIGS. 5 and 6. FIG. 5 is a top view of the rotor 100.

In use, a cooling fluid such as air enters the axial channel 8 through an inlet 16. It passes down the axial channel 8 and enters the plenum chamber 7. As the rotor 100 turns, the rotational motion and angling of the channels 4 causes the cooling fluid to be pumped from the plenum chamber 7 into the radial channels 4. The channels 4, 9 and 10 are oriented such that they form a backswept angle to the direction of rotation of the shaft, improving their pumping performance. When the angle between the radial channels 4 and the axial channel 8 is greater than or less than 90°, the plenum chamber 7 is created and the effectiveness and efficiency of the pumping action of the radial channels 4 is improved. When fluid is forced to change direction, or the geometry of the path it is moving through changes, losses occur. The plenum chamber 7 creates a larger volume for the fluid to flow into as it flows from the axial channel 8 into the radial channels 4, which reduces losses. It also helps to distribute fluid evenly between the channels 4. The outer plenum 5 also helps to reduce losses in this respect.

Where the plenum chamber 7 meets the axial channel 8, a sharp edge is formed during manufacture. These sharp edges are chamfered (not shown) so as to reduce losses as the fluid changes direction when flowing from the axial channel 8 into the radial channels 4 via the plenum chamber 7.

The fluid from the radial channels 4 is then pumped into the further radial channels 9 and 10. Fluid pumped through the channels 9 passes through the axial spacers 6 and is exhausted into the outer plenum 5 between the retaining sleeves 3a and 3b. The fluid then continues out of the outer plenum 5 into the narrow space between the radially outer face of rotor and the inner face of a stator (not shown). The fluid passes in both directions through this space away from the plenum and is finally exhausted out of the ends of the rotor through the exhausts 13. The exhausts 13 act to exhaust the cooling fluid from the rotor radially. This generates a pressure ratio when the rotor 100 turns, which helps to increase the flow through the longitudinal channels 11. Typically, there are stationary end plates in close proximity to the end faces of the rotor 100 (not shown), which would restrict axial outflow.

Cooling fluid pumped into the channels 10 is fed into the longitudinal channels 11 in the pole spacers 12, and exhausted out of the exhausts 13.

In this way, the flow of cooling fluid from the channels 9 provides cooling of the outer surface of the rotor and inner surface of the stator. This heating is principally due to heat generated by mechanical friction losses or windage losses. The flow of cooling fluid from the channels 10 passes down the length of each pole spacer 12 to cool each pole spacer 12, and hence each adjacent magnet assembly 1. This flow bypasses the outer surface of the rotor 100 entirely. This means that the flow of cooling fluid is split and results in two separate cooling paths; one for dealing with internally generated heat, principally caused by electrical losses in the magnets 1, and another for dealing with the heating caused by mechanical losses on the surface of the rotor 100 and stator.

Therefore, it is possible to design the rotor 100 to separately optimise the flow rates and temperatures internally and on the surface of the rotor and select relative flow amounts by choosing an appropriate ratio of the number and size of channels 9 compared to channels 10. This is important because if too much cooling fluid is introduced to the channel between the surface of the rotor 100 and the stator, the cooling efficiency is reduced due to extra heating caused by frictional effects between the fluid and the rotor 100 and the stator. Thus, the optimum amount of cooling fluid can be directed between the stator and rotor with the rest of the cooling fluid being channelled internally.

Each of the magnet frames formed by the axial spacers 6, pole spacers 12 and the annular sections 15, are preferably formed as a single piece. This allows the channels 4 to be machined into the rotor core 2. The magnet frames can also be machined to form the channels 9 and 10. Half of the channels 9 and 10 can be formed on the end faces of each of the magnet frames, so that when the two frames are brought together on the machine, the half channels come together to form complete channels. By forming the channels in an end face, the process of machining the half channels is made easier.

Once the frames are mated and assembled to the core 2, the full set of radial channels 4, 9 and 10 is created. The magnet frames are fully mated so that there is no leakage of cooling fluid from the mated half channels. The channels 4, 9 and 10 are preferably located in the centre of the longitudinal axis of the rotor 100. When the channels 4, 9 and 10 are formed in the centre of the longitudinal axis of the rotor 100, this helps to minimise the temperature gradient along the axial channel 8.

Although the axial channel 8 is described in the embodiment above as having one closed end, it could also be open at both ends so that air can be fed to the radial channels 4 from both ends of the axial channel 8.

The channels 9 could be omitted if it is required to have a cooling system cooling only for the magnets.

Furthermore, although the magnets in the embodiment above are described as permanent magnets constructed from a rare earth metal, they could be constructed from any magnetic material, or could be electromagnets with variable field strength.

Thus an aspect of the present invention provides the advantage of a self-cooled rotor, without the need for an external pumping means for cooling fluid, which avoids a high pressure and temperature gradient along the length of the rotor and provides separate parallel cooling circuits for the magnets and the surface of the rotor. The pumping action of the rotor may be the only pump for the cooling fluid or it may be used simply to augment other pumping means.

Although the present invention has been described hereinabove with reference to specific embodiments, the present invention is not limited to the specific embodiments and modifications will be apparent to a skilled person in the art which lie within the scope of the present invention as claimed.

The invention claimed is:

1. A rotor for an electric machine, comprising:
a main body;
one or more magnetic field generators arranged around the outer periphery of the main body;
a first channel extending axially into the main body from at least one end to a central region; and
one or more second channels extending radially outwardly between said first channel and a radially outer surface of the rotor for communicating cooling fluid therebetween;
one or more third channels, each extending axially into the rotor from one or the other end of the rotor and arranged in proximity to the magnetic field generator; and
one or more fourth channel in the central region, each extending radially outwardly between said first channel and a respective third channel for communicating cooling fluid therebetween.

2. The rotor according to claim 1, wherein the fourth channels extend into the rotor in a substantially radial direction.

3. The rotor according to claim 1, wherein the fourth channels are swept in a plane perpendicular to a longitudinal axis of the rotor.

4. The rotor according to claim 1, wherein the fourth channels are arranged in a plane perpendicular to the longitudinal axis of the rotor passing through the longitudinal centre of the rotor.

5. The rotor according to claim 1, wherein the second channels and the fourth channels are arranged in a common plane.

6. The rotor according to claim 1, wherein the fourth channels are arranged at the same angle relative to the radii of the rotor as the second channels.

7. The rotor according to claim 1, wherein the inner ends of the second channels and the inner ends of the fourth channels open into an internal plenum chamber surrounding the first channel.

8. The rotor according to claim 7, wherein edges defining a junction between the inner ends of the second and fourth channels and the internal plenum chamber are chamfered.

9. A rotor for an electric machine, comprising:
a main body;
one or more magnetic field generators arranged around the outer periphery of the main body;
a first channel extending axially into the main body from at least one end to a central region; and
one or more second channels extending radially outwardly between said first channel and a radially outer surface of the rotor for communicating cooling fluid therebetween;
a plurality of magnetic field generators arranged in two groups, with one group arranged around one half of the main body and the other group arranged around the other half of the main body, a space being provided between the two groups; and
spacers placed in a longitudinally extending gap between pairs of magnetic field generators of each group, to circumferentially separate the magnets from each other, wherein some or all of the spacers include one of the third channels passing through them,
wherein the spacers form part of a frame structure forming an annular cylinder around the main body of the rotor and including recesses in which the magnetic field generators are arranged.

10. The rotor according to claim 9, wherein the frame structure is formed in two parts provided at either side of the axial centre of the rotor.

\* \* \* \* \*